United States Patent
Robbins, III et al.

(10) Patent No.: US 9,284,746 B2
(45) Date of Patent: Mar. 15, 2016

(54) INSULATED FENCE TENSIONER

(71) Applicant: Edward S. Robbins, III, Muscle Shoals, AL (US)

(72) Inventors: Edward S. Robbins, III, Muscle Shoals, AL (US); Don Byron Walker, II, Muscle Shoals, AL (US); Bryan F. Magee, Killen, AL (US); Milton Forrest Bain, Muscle Shoals, AL (US)

(73) Assignee: Edward S. Roberts, III, Muscle Shoals, AL (US)

( * ) Notice: Subject to any disclaimer, the term of this patent is extended or adjusted under 35 U.S.C. 154(b) by 74 days.

(21) Appl. No.: 14/088,592

(22) Filed: Nov. 25, 2013

(65) Prior Publication Data

US 2015/0144855 A1     May 28, 2015

(51) Int. Cl.
| | |
|---|---|
| *E04H 17/02* | (2006.01) |
| *E04H 17/26* | (2006.01) |
| *A01K 3/00* | (2006.01) |
| *B21F 9/00* | (2006.01) |
| *B60P 7/08* | (2006.01) |

(52) U.S. Cl.
CPC ............... *E04H 17/266* (2013.01); *A01K 3/00* (2013.01); *A01K 3/005* (2013.01); *B21F 9/002* (2013.01); *B60P 7/083* (2013.01)

(58) Field of Classification Search
CPC ........ E04H 17/266; A01K 3/005; A01K 3/00; B21F 9/00; B21F 9/002; B21F 9/02; Y10T 24/2109; Y10T 24/2113; Y10T 24/2117; Y10T 24/2121; B66D 1/34
USPC ................. 256/10, 37, 40, 42, 32, 41, 43, 44; 254/217, 222, 223; 24/909; 242/388.1, 242/388.2, 388.3
See application file for complete search history.

(56) References Cited

U.S. PATENT DOCUMENTS

| | | | |
|---|---|---|---|
| 1,403,042 A   | 1/1922 | Leonard | |
| 2,586,048 A * | 2/1952 | Hyatt ...................... B60P 7/083 |
| | | | 24/68 CD |
| 3,016,229 A * | 1/1962 | Jacobson ........................ 256/10 |
| 3,806,992 A * | 4/1974 | Reimer ...................... 242/378.3 |
| 3,980,277 A   | 9/1976 | Enoksson | |
| 4,090,472 A   | 5/1978 | York | |
| 4,111,400 A * | 9/1978 | Enoksson ........................ 256/47 |
| 4,385,736 A * | 5/1983 | Yamamoto .................... 242/376 |
| 4,465,236 A   | 8/1984 | Calder | |
| 4,533,120 A   | 8/1985 | Ruddock | |
| 4,684,107 A   | 8/1987 | Robbins, Jr. | |
| 4,755,633 A   | 7/1988 | Standing | |
| 4,819,914 A   | 4/1989 | Moore | |
| 4,824,049 A * | 4/1989 | Kelly, Sr. .................. 244/110 C |

(Continued)

*Primary Examiner* — Daniel P Stodola
*Assistant Examiner* — Matthew R McMahon
(74) *Attorney, Agent, or Firm* — Brinks Gilson & Lione

(57) ABSTRACT

An insulated fence tensioner for use with a flexible polymer fence rail having at least one electrically conductive member has a metal barrel including a slot for receiving an end of the fence rail. An electrically non-conductive tubular liner is situated within the metal barrel, the liner including two edges defining a slot aligned with the metal barrel slot. An electrically non-conductive sleeve surrounds the metal barrel, the sleeve including two edges defining a slot aligned with the metal barrel slot. One set of the liner and sleeve edges are formed as a pair of folded edges positioned to penetrate the metal barrel slot and overlap the other set of the edges. An electrically non-conductive flange is positioned between the electrically conductive member of the flexible polymer fence rail and the metal mounting bracket of the fence tensioner.

19 Claims, 5 Drawing Sheets

(56) References Cited

U.S. PATENT DOCUMENTS

| | | | |
|---|---|---|---|
| 4,860,996 A | 8/1989 | Robbins, III | |
| 4,967,976 A * | 11/1990 | Kawai et al. | 242/586.2 |
| 4,973,029 A | 11/1990 | Robbins, III | |
| 5,203,542 A | 4/1993 | Coley et al. | |
| 5,452,863 A * | 9/1995 | Hardy, Sr. | B60R 22/34 242/376 |
| 6,070,823 A | 6/2000 | Clary | |
| 6,257,558 B1 * | 7/2001 | Levine et al. | 256/10 |
| 6,431,487 B1 | 8/2002 | Wall | |
| 6,533,881 B1 | 3/2003 | Wall | |
| 6,648,305 B2 | 11/2003 | House et al. | |
| 6,688,912 B2 * | 2/2004 | Eastman et al. | 439/498 |
| 6,834,846 B2 | 12/2004 | Robbins, III | |
| 6,848,678 B2 | 2/2005 | Reiff | |
| 7,472,890 B2 * | 1/2009 | Huang | 254/223 |
| 7,475,869 B2 | 1/2009 | Dennis | |
| 7,513,452 B2 * | 4/2009 | Ruan | 242/587.1 |
| 7,950,629 B2 * | 5/2011 | Mamie | B60P 7/083 24/69 CT |
| 8,231,109 B2 * | 7/2012 | Peng | B65H 75/28 242/388.5 |
| 8,680,997 B2 * | 3/2014 | Gallagher | 340/550 |
| 2003/0218162 A1 * | 11/2003 | Tackett et al. | 256/68 |
| 2010/0051887 A1 * | 3/2010 | Wooster | B21F 9/00 254/217 |
| 2012/0298942 A1 * | 11/2012 | Tyrrell et al. | 256/10 |

* cited by examiner

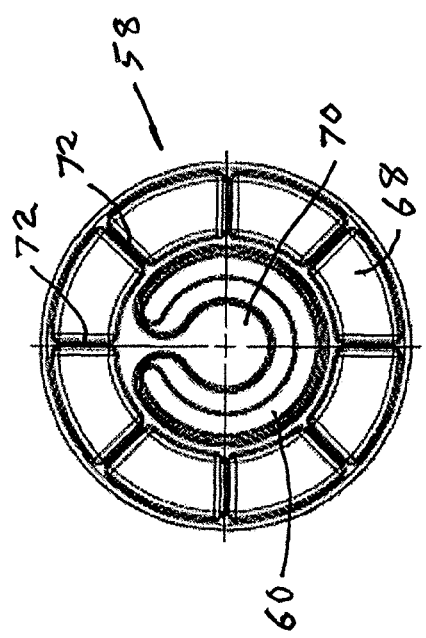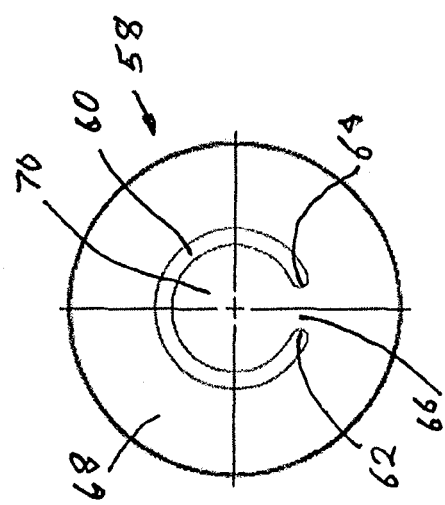

INSULATED FENCE TENSIONER

BACKGROUND

1. Field of the Invention

This invention relates to fence tensioners especially designed for use with flexible polymer fence rails.

2. Background of the Invention

Over the past several years, composite metal and plastic fence systems have become increasingly accepted for the confinement of livestock, thoroughbred horses and the like. Typically, the fence rails are comprised of at least two wires or other high strength fibers encased in a polymer such as vinyl or other suitable plastic web. Depending on the width of the fence rail, two wires may extend along the opposite edges of the slat or, for wider slats, a third or even fourth wire may be added intermediate the edge wires. To maximize the effectiveness of the flexible fence rails, tensioning devices must be utilized to insure that the individual rails do not sag between posts. Fence tensioners have long been used to tighten individual strands in wire fence systems. The forces that need to be applied to the fence systems are such that the fence tensioners are typically constructed of metal, which is often at least partially electrically conductive. Examples of fence tensioners can be found in U.S. Pat. Nos. 6,431,487; 6,648,305; 6,848,678; and 7,475,869.

It is known to include electrically conductive wires in fence constructions for the confinement of livestock. Such systems generally include one or more electrically conductive wires. It is also known to utilize an electrically conductive wire in combination with a more visible horizontal structural element to enhance the likelihood that the animal, when shocked, will shy away from the fence. A particularly useful and more visible horizontal structural element is known to have a plurality of vertically spaced, high tensile-strength wires joined by intervening plastic webs. Examples of electrically conductive fence wires with high visibility plastic webbing can be found in U.S. Pat. Nos. 4,755,633; 5,203,542; and 6,834,846. Commonly employed fence tensioners are sometimes not electrically isolated from the conductive portion of the fence rail, thus contributing to a shorting or ground fault that can cause some portion of an electrical fence to become ineffective or inoperative.

There remains a need for a fence tensioner that will contribute to the electrical isolation of the charge carrying wires of a fence rail.

SUMMARY

An insulated fence tensioner for use with a flexible polymer fence rail having at least one electrically conductive member can include a metal barrel including a slot for receiving an end of the fence rail. An electrically non-conductive tubular liner can be situated within the metal barrel. The tubular liner can include two edges defining a slot that can be aligned with the metal barrel slot. An electrically non-conductive sleeve can surround the metal barrel. The sleeve can include a pair of folded edges that can be positioned to penetrate the metal barrel slot and overlap the liner edges. Alternatively, the liner can include a pair of folded edges that can be positioned to penetrate the metal barrel slot and overlap the sleeve edges.

In one embodiment, the insulated fence tensioner can also include a first flange coupled to a first end of the metal barrel and a second flange coupled to a second end of the metal barrel. One of the first and second flanges can be formed of an electrically non-conductive material. One of the first and second flanges can be coupled to an end of the metal barrel to retain the tubular liner and sleeve at desired positions relative to the sleeve. The electrically non-conductive flange can include an arcuate slot dimensioned to receive one end of the metal barrel.

In one embodiment, the insulated fence tensioner can also include a bracket having a space pair of parallel plates, each plate including an opening adapted to receive one end of the metal barrel. A flange having a spaced plurality of projections can also be coupled to an end of the metal barrel, and a pawl can be pivotally mounted to the bracket so that an end of the pawl interacts with the spaced plurality of projections to selectively prevent rotation of the barrel relative to the bracket.

One feature of the insulated fence tensioner is the presence of a liner and sleeve, both made of electrically non-conductive materials, at least one of the liner and sleeve having folded edges that overlap the corresponding edges of the other to define a slot to receive a flexible polymer fence rail having at least one electrically conductive member. This feature inhibits any electrical shorting or grounding of the electrically conductive member by preventing contact with the metal barrel of the fence tensioner.

Another feature of the insulated fence tensioner is the presence of an electrically non-conductive flange positioned between the electrically conductive member of the flexible polymer fence rail and the metal mounting bracket of the fence tensioner. This feature inhibits any electrical shorting or grounding of the electrically conductive member by preventing contact with the metal plates holding the metal barrel of the fence tensioner.

The above, as well as other features and advantages, will become readily apparent to those skilled in the art from the following detailed description of a preferred embodiment when considered in the light of the accompanying drawings.

BRIEF DESCRIPTION OF THE DRAWINGS

FIG. 2 is a bottom plan view of an electrically nonconductive flange used in the tensioner shown in FIG. 1.

FIG. 3 is a top plan view of the electrically nonconductive flange shown in FIG. 2.

DESCRIPTION OF PREFERRED EMBODIMENTS

Figure 1:
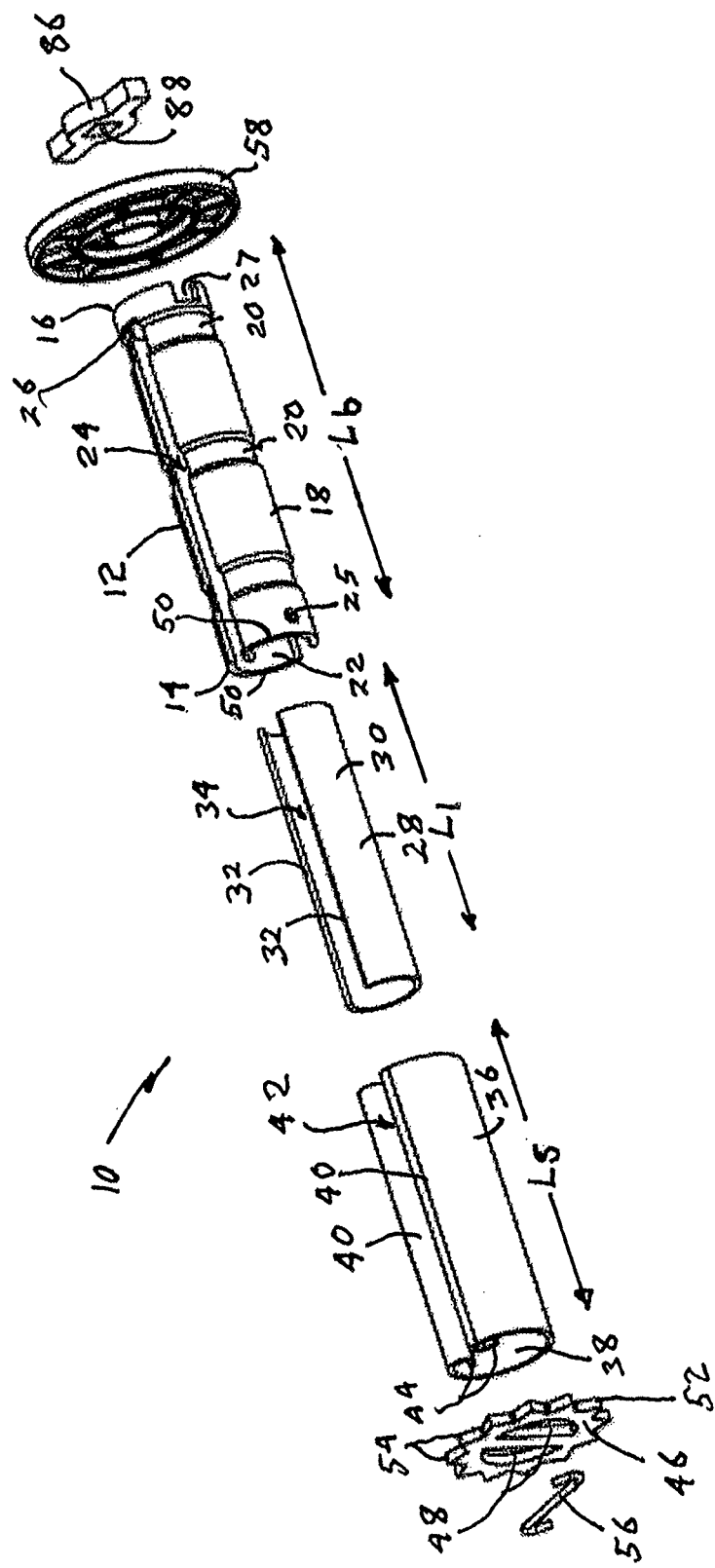
FIG. 1 is an exploded perspective view of an insulated fence tensioner.

With reference to all the drawings, the same reference numerals are generally used to identify like components. FIG. 1 shows in exploded view some of the components of a fence tensioner 10. The components include a metal barrel 12 having a first end 14 and a second end 16. The barrel 12 can have a generally smooth annular outside surface 18, which can also include a plurality of annular grooves 20. The barrel 12 can also have a generally smooth annular inside surface 22. A longitudinal slot 24 is provided through the barrel 12 extending between the outside surface 18 and the inside surface 22 to receive an end of a fence rail as discussed later in connection with FIGS. 4-6. The longitudinal slot 24 extends from the first end 14 to a position 26 adjacent to, but spaced from, the second end 16. One or more apertures 25 can be situated adjacent the first end 14. At least one short slot 27 can be provided in the second end 16.

An electrically non-conductive tubular liner 28 can be situated to be received within the metal barrel 12. The tubular liner 28 can have an outside cylindrical surface 30 dimensioned to be received contiguously to the inside surface 22 of the barrel 12. The liner 28 can have a length $L_l$, which is slightly shorter than the length $L_b$ of the barrel 12. The liner 28 can include two edges 32 defining a slot 34 that can be aligned with the metal barrel slot 24 when the liner 28 is inserted inside the barrel 12.

An electrically non-conductive sleeve 36 can have an inside cylindrical surface 38 dimensioned to be received contiguously over the outside surface 18 of the barrel 12. The sleeve 36 can have a length $L_s$, which is slightly shorter than the length $L_b$ of the barrel 12. The sleeve 36 can include two edges 40 defining a longitudinal slot 42. The edges 40 are shown in FIG. 1 to be formed as a pair of folded edges 44 adapted to penetrate the metal barrel slot 24 and overlap the edges 32 of liner 28. It will be appreciated that the same effect can be achieved by providing the edges 32 of liner 28 with outwardly extending folded edges similar to edges 44, which would likewise penetrate the metal barrel slot 24 and overlap the edges 40 of sleeve 36. The electrically non-conductive tubular liner 28 and the electrically non-conductive sleeve 36 can be conveniently made by an extrusion process using a thermoplastic material such as polyvinyl chloride (PVC), high density polyethylene, polycarbonate, polypropylene, and polystyrene as well as others having the required electrically non-conductive characteristics.

A first flange 46 is provided that can be coupled to the first end 14 of the barrel 12. The first flange 46 can include a pair of openings 48 dimensioned to receive the two arcuate ends 50 of the barrel first end 14. The first flange 46 can also have an outside edge 52 defined by a spaced plurality of projections 54, which can interact with a pawl as discussed later in conjunction with FIG. 6. A keeper 56 can be provided to secure the first flange 46 to the barrel first end 14 by engagement with apertures 25.

A second flange 58, shown in FIGS. 1-3, can be formed of an electrically non-conductive material by an injection molding process using a thermoplastic material such as polyvinyl chloride (PVC), high density polyethylene, polycarbonate, polypropylene, and polystyrene as well as others having the required electrically non-conductive characteristics. The second flange 58 has a diameter that is larger than the diameter of barrel 12. The second flange 58 can have an arcuate slot 60 dimensioned to receive the second end 16 of the metal barrel 12. The ends 62 and 64 of the arcuate slot 60 define a web 66 joining an outer portion 68 of the second flange 58 to and inner portion 70. The web 66 is preferably dimensioned to be received in a short slot 27 in the second end 16 of barrel 12. The outer portion 68 can include a plurality of radial webs 72 on at least one side of the second flange 58.

Figure 4:
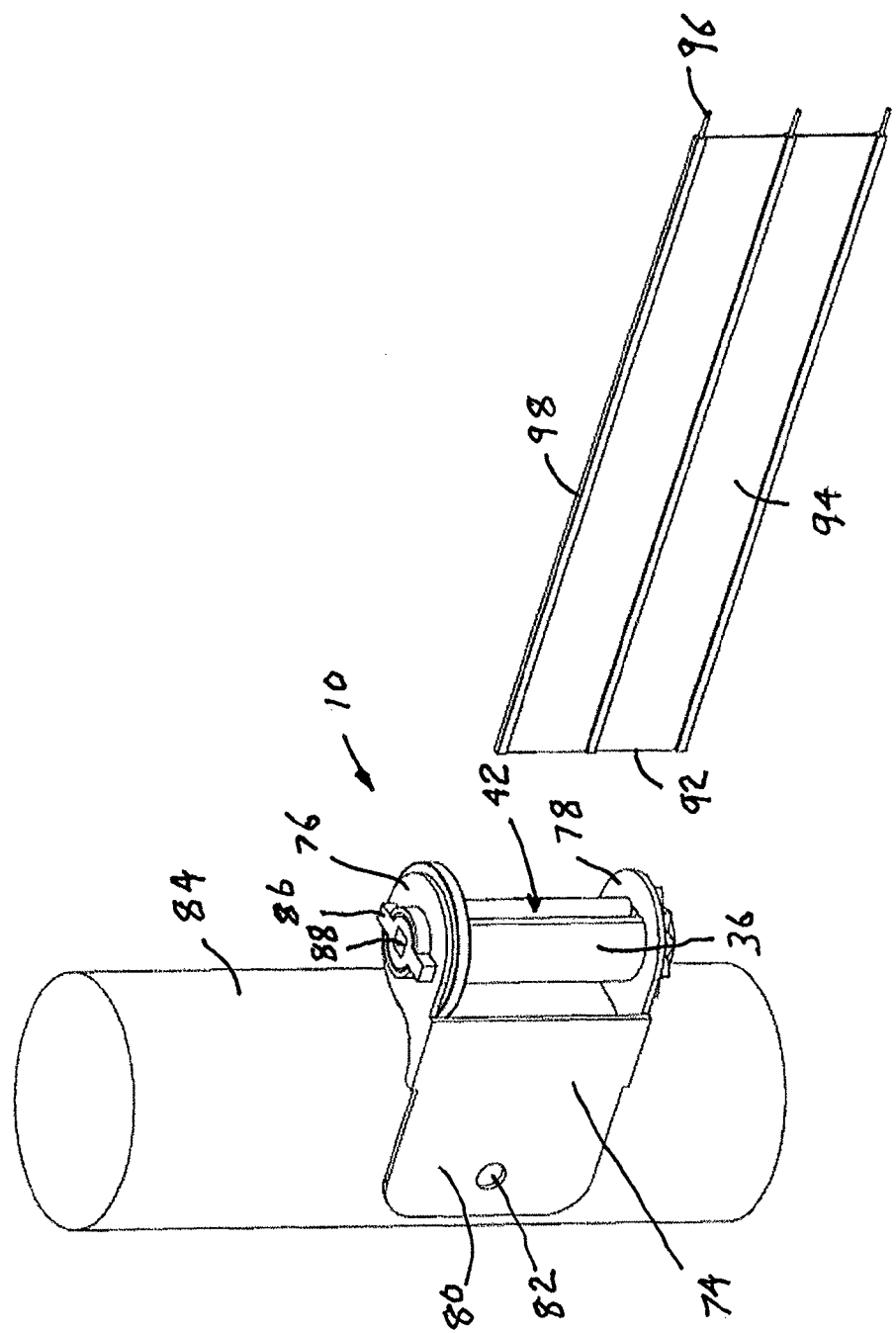
FIG. 4 is a perspective view of an insulated fence tensioner about to receive an end of a flexible polymer fence rail.
Figure 5:
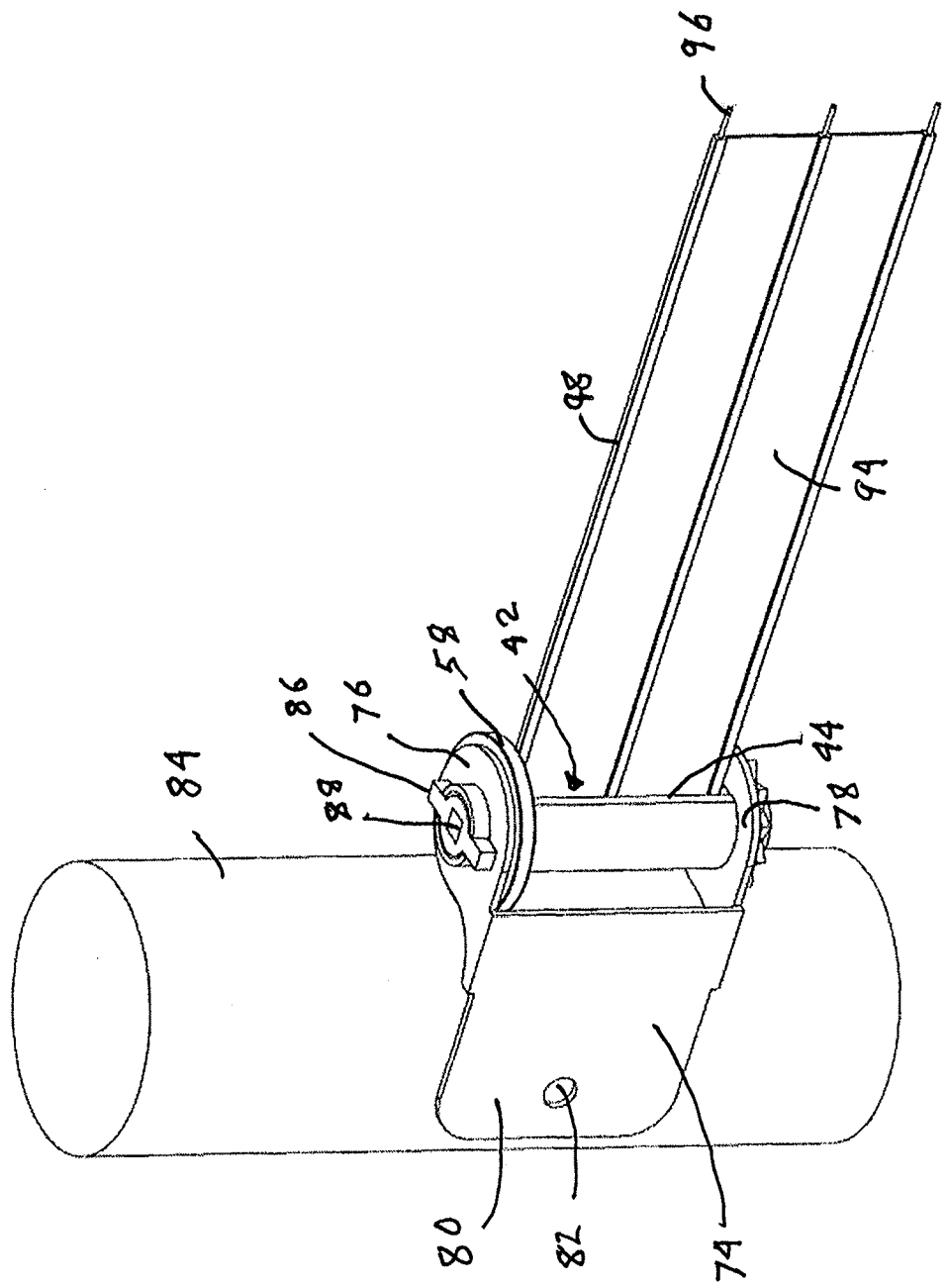
FIG. 5 is a perspective view similar to FIG. 2 showing the flexible polymer fence rail inserted into the insulated fence tensioner barrel.
Figure 6:
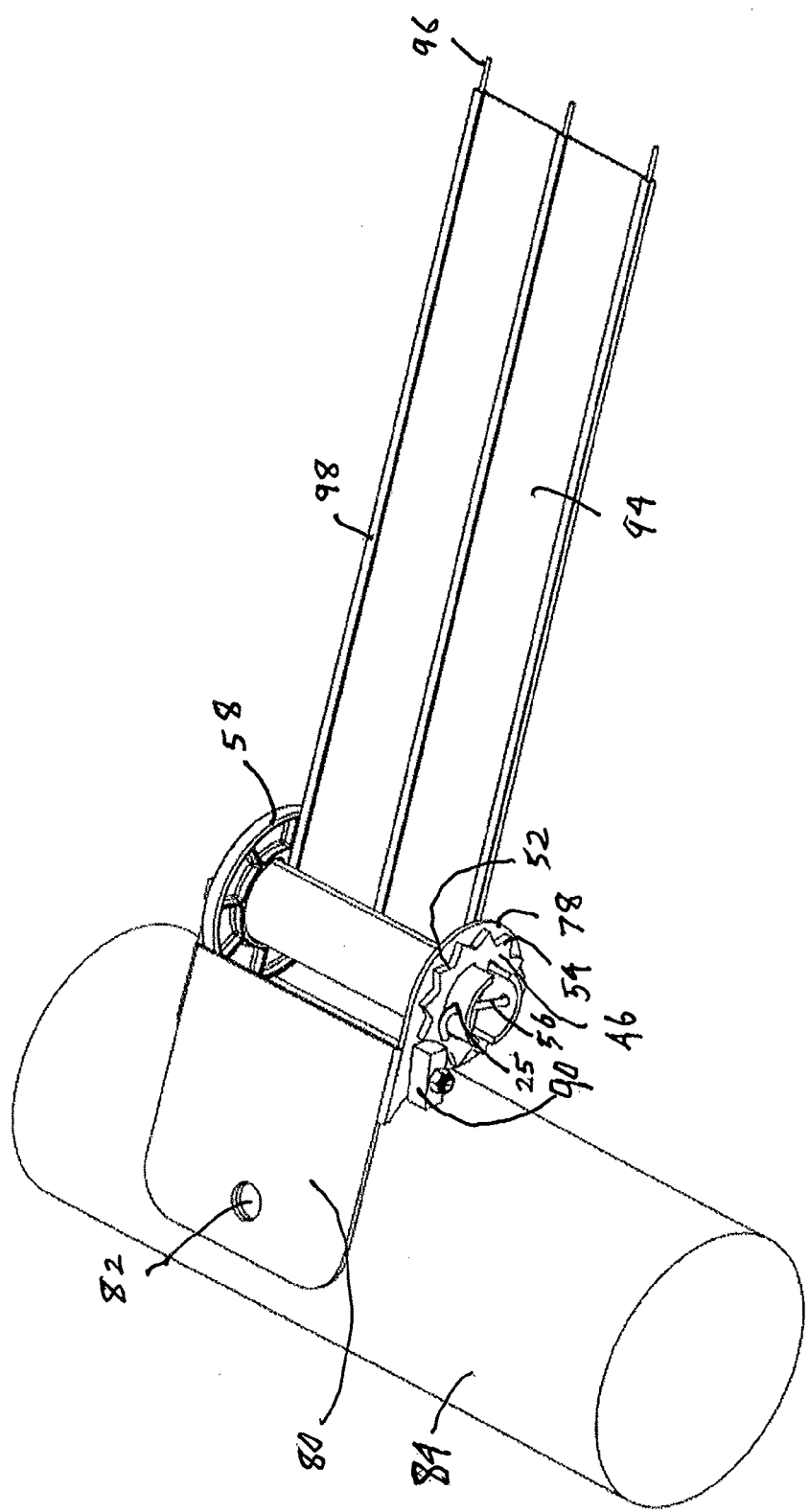
FIG. 6 is a bottom perspective view showing the interaction of the metal ratchet wheel with a stop.

FIGS. 4-6 show a fully assembled fence tensioner 10, including a metal mounting bracket 74 having a spaced pair of parallel plates 76, 78 each plate including an opening adapted to receive one end of the metal barrel. The mounting bracket 74 also includes a tongue 80 including at least one opening 82 to receive a fastener to secure the mounting bracket to a fence post 84. A key 86 is also provided that can be received in the short slots 27 in the second end 16 of barrel 12. The key 86 can have a central opening 88 dimensioned to receive the drive shaft of a ratchet wrench, or similar tool, to permit the barrel 12 of the fence tensioner 10 to be tightened. A pawl 90, shown in FIG. 6, can be rotatably mounted to one of the plates 76, 78 to interact with the projections 54 on the outside edge 52 of the first flange 46 to retain the barrel at a desired tightness.

The fence tensioner 10 can be assembled by inserting the electrically non-conductive tubular liner 28 inside the barrel 12 so that the slot 34 of the tubular liner 28 is aligned with the slot 24 of the barrel 12. The electrically non-conductive sleeve 36 and the first flange 46 are then positioned between the spaced parallel plates 76, 78 of the mounting bracket 74. The combined barrel 12 and liner 28 are then inserted through the opening in the upper parallel plate 76 so that the edges of slots 24 and 34 straddle the web 66 of the second flange 58. The combined barrel 12 and liner 28 are then pushed into engagement with the electrically non-conductive sleeve 36 so that the folded edges 44 penetrate the slots 24 and 34, and overlap the edges 32 of liner 28. The second flange 58 is thus captured between an upper end of the sleeve 36 and the upper parallel plate 76. The first end 14 of the barrel 12 proceeds through the opening in the lower parallel plate 78, and the first flange 46 is secured to the barrel 12 by a suitable keeper 56 inserted through apertures 25 adjacent the barrel first end 14, as shown in FIG. 6. The key 86 can be secured in the short slots 27 at any time. For example, the second end 16 of the barrel 12 can be deformed by swaging to retain the key 86 in the short slots 27. Alternate means can be used to retain the key 86 in the short slots 27.

Once the fence tensioner 10 is assembled and secured to a fence post 84, an end 92 of a flexible polymer fence rail 94 having at least one electrically conductive member 96 can be inserted into the slot 42 as shown in FIG. 4. As a general rule, the electrically conductive member 96 is arranged at the top 98 of the fence rail 94, so that livestock leaning over the fence rail will receive a shock sufficient to inhibit this behavior. Once the fence rail 94 is inserted into the slot 42 defined by the folded edges 44 as shown in FIG. 5, the end of the electrically conductive member 96 come into contact with the electrically non conductive liner 28 rather than the metal barrel 12. As indicated earlier, the at least one electrically conductive member 96 is preferably positioned on the upper edge 98 of the fence rail 94 so as to be adjacent to the electrically non-conductive flange 58, which has a diameter sufficient to prevent contact between the electrically conductive member 96 and the upper plate 76 of the mounting bracket 74. The barrel 12 can then be rotated by a suitable tool inserted into the opening 88 in key 86 to provide the desired tension to the fence rail 94 which will then be maintained by the pawl 90 shown in FIG. 6.

In accordance with the provisions of the patent statutes, the present invention has been described in what is considered to represent its preferred embodiment. However, it should be noted that the invention can be practiced otherwise than as specifically illustrated and described.

The invention claimed is:

1. An insulated fence tensioner for use with a flexible polymer fence rail having at least one electrically conductive member comprising: a metal barrel including a slot for receiving an end of the fence rail, an electrically non-conductive tubular liner having an outside cylindrical surface that is contiguously situated on an inside surface of the metal barrel, to form a non-conductive barrier, the liner including two edges defining a slot aligned with the metal barrel slot, and an electrically non-conductive sleeve surrounding an outside surface of the metal barrel, the sleeve including two edges defining a slot aligned with the metal barrel slot, one set of the liner and sleeve edges being formed as a pair of folded edges positioned to penetrate the metal barrel slot and overlap the other set of the edges such that any flexible polymer fence rail received in the slot is insualted from the metal barrel by the non-conductive tubular liner and the non-conductive sleeve.

2. The insulated fence tensioner of claim 1, wherein the edges of the sleeve are formed to include the pair of folded edges that are positioned to overlap the edges of the liner.

3. The insulated fence tensioner of claim 1, further comprising a first flange coupled to a first end of the metal barrel and a second flange coupled to a second end of the metal barrel, one of the first and second flanges being formed of an electrically non-conductive material.

4. The insulated fence tensioner of claim 3, wherein the at least one electrically conductive member of the flexible polymer fence rail is situated on one edge of the flexible polymer fence rail and is configured to be placed adjacent to the flange formed of electrically non-conductive material.

5. The insulated fence tensioner of claim 1, further comprising a bracket having a spaced pair of parallel plates, each plate including an opening adapted to receive one end of the metal barrel.

6. The insulated fence tensioner of claim 5, further comprising a flange coupled to one end of the metal barrel, the flange including a spaced plurality of projections, and a pawl pivotally mounted to the bracket so that an end of the pawl interacts with the projections to selectively prevent rotation of the barrel relative to the bracket.

7. The insulated fence tensioner of claim 5, further comprising a key coupled to an end of the metal barrel, the key including a central opening dimensioned to receive a tool for rotating the metal barrel relative to the bracket.

8. The insulated fence tensioner of claim 1, wherein the metal barrel comprises a first end and a second end, wherein the slot for receiving an end of the fence rail extends from the first end to a position adjacent to, but spaced from, the second end.

9. The insulated fence tensioner of claim 8, further comprising a second slot in the second end, shorter than the first slot, and a key fixed in the second slot, the key including a central opening dimensioned to receive a tool for rotating the metal barrel relative to the bracket.

10. The insulated fence tensioner of claim 1, wherein the pair of folded edges positioned to penetrate the metal barrel further define an opening dimensioned to be greater than a thickness of the end of the fence rail.

11. The insulated fence tensioner of claim 10, wherein the pair of folded edges positioned to penetrate the metal barrel slot and overlap the other set of edges define an elongated opening dimensioned to receive the end of the fence rail.

12. The insulated fence tensioner of claim 1, further comprising a first flange opposite a second flange, the first flange configured to receive a first end of the metal barrel in a plurality of apertures including in the first flange, and the second flange being electrically non-conducting and configured to receive a second end of the metal barrel.

13. The insulated fence tensioner of claim 12, wherein the second flange comprises and arcuate slot dimensioned to receive the second end of the metal barrel.

14. An insulated fence tensioner for use with a flexible polymer fence rail having at least one electrically conductive member comprising: a metal mounting bracket having a spaced pair of parallel plates, a metal barrel coupled to the plates, the metal barrel including a slot for receiving an end of the fence rail, an electrically non-conductive tubular liner comprising a longitudinally extending outside cylindrical surface that is contiguously coupled with an interior surface of the metal barrel, the liner including two edges defining a slot aligned with the metal barrel slot, and an electrically non-conductive sleeve surrounding and contiguously coupled with an exterior surface of the metal barrel, the sleeve including two edges defining a slot aligned with the metal barrel slot, one set of the liner and sleeve edges being formed as a pair of folded edges positioned to penetrate the metal barrel slot and overlap the other set of the edges so as to insulate the interior surface and the exterior surface of the metal barrel from contact with any flexible polymer fence rail received in the metal barrel slot.

15. The insulated fence tensioner of claim 14, wherein the electrically non-conductive sleeve surrounding the metal barrel has an upper end and a lower end, a first of the upper and lower ends of the sleeve abutting one of the spaced pair of parallel plates.

16. The insulated fence tensioner of claim 15, further comprising a first flange coupled to a first end of the metal barrel and a second flange coupled to a second end of the metal barrel, one of the first and second flanges being situated between a second of the upper and lower ends of the sleeve and an adjacent one of the spaced pair of parallel plates and being formed of an electrically non-conductive material.

17. The insulated fence tensioner of claim 16, wherein the at least one electrically conductive member of the flexible polymer fence rail is situated on one edge of the flexible polymer fence rail and is configured to be placed adjacent the flange formed of electrically non-conductive material.

18. The insulated fence tensioner of claim 14, further comprising a flange coupled to one end of the metal barrel, the flange including a spaced plurality of projections, and a pawl pivotally mounted to the bracket so that an end of the pawl interacts with the projections to selectively prevent rotation of the barrel relative to the bracket.

19. The insulated fence tensioner of claim 14, further comprising a key coupled an end of the metal barrel, the key including a central opening dimensioned to receive a tool for rotating the metal barrel relative to the bracket.

* * * * *

UNITED STATES PATENT AND TRADEMARK OFFICE
CERTIFICATE OF CORRECTION

PATENT NO.         : 9,284,746 B2
APPLICATION NO.    : 14/088592
DATED              : March 15, 2016
INVENTOR(S)        : Edward S. Robbins, III et al.

Page 1 of 1

It is certified that error appears in the above-identified patent and that said Letters Patent is hereby corrected as shown below:

In the Claims

Column 5, line 1, delete "insualted" and insert --insulated--.

Column 5, line 52, delete "including" and insert --included--.

Column 6, line 4, delete "and" and insert --an--.

Column 6, line 39, between "adjacent" and "the" insert --to--.

Column 6, line 48, between "coupled" and "an" insert --to--.

Signed and Sealed this
Twenty-eighth Day of June, 2016

Michelle K. Lee
*Director of the United States Patent and Trademark Office*